United States Patent
Watanabe et al.

(10) Patent No.: US 10,315,569 B2
(45) Date of Patent: Jun. 11, 2019

(54) SURROUNDINGS MONITORING APPARATUS AND PROGRAM THEREOF

(71) Applicant: AISIN SEIKI KABUSHIKI KAISHA, Kariya-shi, Aichi-ken (JP)

(72) Inventors: Kazuya Watanabe, Anjo (JP); Tetsuya Maruoka, Okazaki (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 533 days.

(21) Appl. No.: 14/566,811

(22) Filed: Dec. 11, 2014

(65) Prior Publication Data

US 2015/0197197 A1 Jul. 16, 2015

(30) Foreign Application Priority Data

Jan. 10, 2014 (JP) ................ 2014-003795

(51) Int. Cl.
*B60R 1/00* (2006.01)
*G09G 5/377* (2006.01)
*G08G 1/16* (2006.01)

(52) U.S. Cl.
CPC ............... *B60R 1/00* (2013.01); *G08G 1/16* (2013.01); *G09G 5/377* (2013.01); *B60R 2300/207* (2013.01); *B60R 2300/302* (2013.01); *B60R 2300/304* (2013.01); *B60R 2300/806* (2013.01); *G09G 2320/10* (2013.01); *G09G 2340/12* (2013.01); *G09G 2340/14* (2013.01); *G09G 2380/10* (2013.01)

(58) Field of Classification Search
CPC ............. B60R 1/00; G08G 1/16; G09G 5/377
USPC .......................................... 348/118
See application file for complete search history.

(56) References Cited

U.S. PATENT DOCUMENTS

2010/0265048 A1* 10/2010 Lu ................... B60Q 9/005
340/435
2011/0025489 A1* 2/2011 Shimoda ............ B60R 1/00
340/459

FOREIGN PATENT DOCUMENTS

| DE | 102007016055 A1 | 5/2008 |
| FR | 2979300 A1 | 3/2013 |
| JP | 2002-314991 A | 10/2002 |

(Continued)

OTHER PUBLICATIONS

Communication dated Sep. 9, 2015 from the European Patent Office in counterpart European Application No. 14196199.5.

(Continued)

*Primary Examiner* — Mehrdad Dastouri
*Assistant Examiner* — Kristin Dobbs
(74) *Attorney, Agent, or Firm* — Sughrue Mion, PLLC

(57) ABSTRACT

A surroundings monitoring apparatus includes an obtaining portion obtaining a first captured image data outputted by a first image capturing portion and a second captured image data outputted by a second image capturing portion, and an output portion superimposingly displaying an indicator in at least one of a first display region and a second display region, in a case where the superimposed region of the indicator is included in the other of the first display region and the second display region, the output portion superimposingly displaying the indicator in the other of the first display region and the second display region in a display manner which corresponds to a display manner of the indicator displayed in the one of the first display region and the second display region.

7 Claims, 8 Drawing Sheets

(56) References Cited

FOREIGN PATENT DOCUMENTS

| JP | 2003-199093 | A |   | 7/2003 |           |
|----|-------------|---|---|--------|-----------|
| JP | 2003199093  | A | * | 7/2003 | B60Q 1/484 |
| JP | 2003-259356 | A |   | 9/2003 |           |
| JP | 2006-260578 | A |   | 9/2006 |           |
| JP | 2010-42811  | A |   | 2/2010 |           |
| JP | 2011-35729  | A |   | 2/2011 |           |

OTHER PUBLICATIONS

Communication dated Sep. 12, 2017 from the Japanese Patent office in corresponding application No. 2014-003795.

* cited by examiner

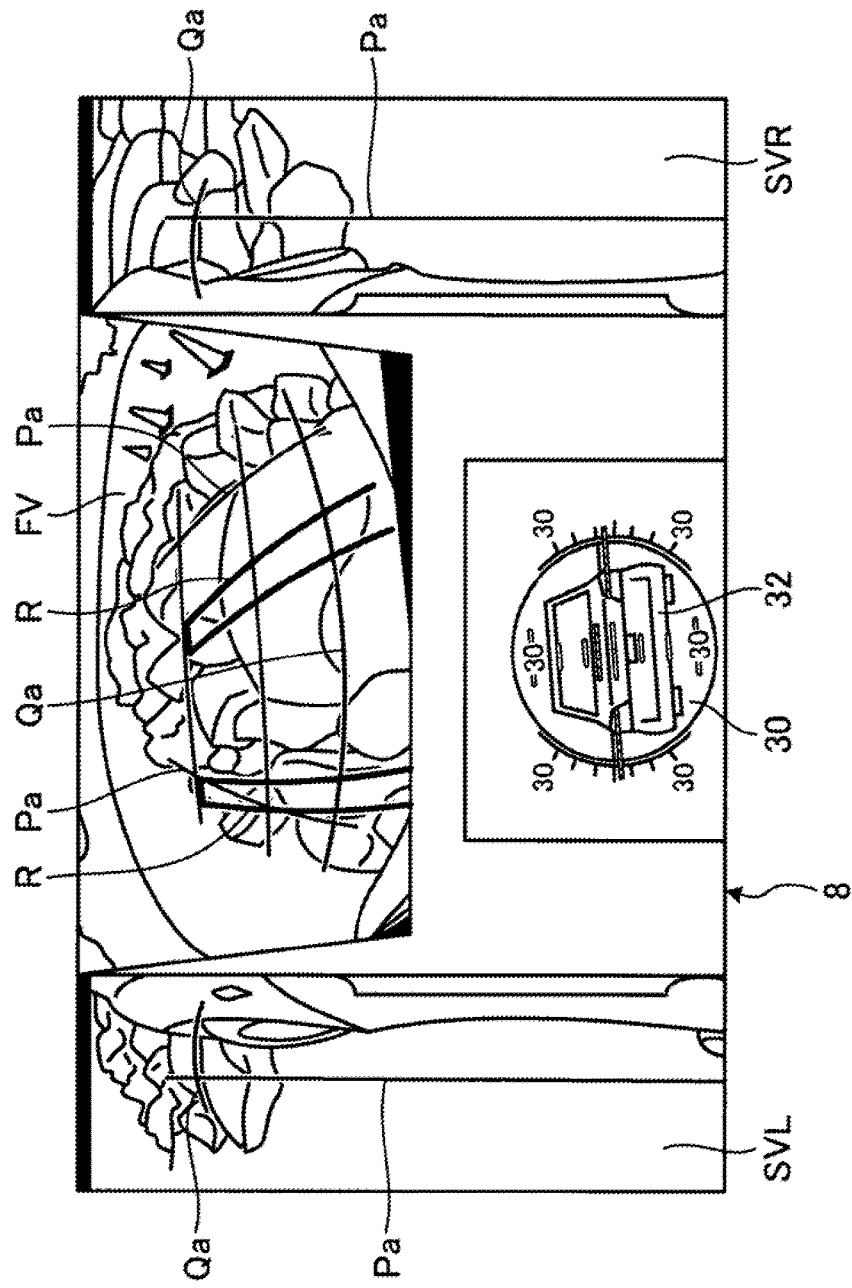

F I G. 6
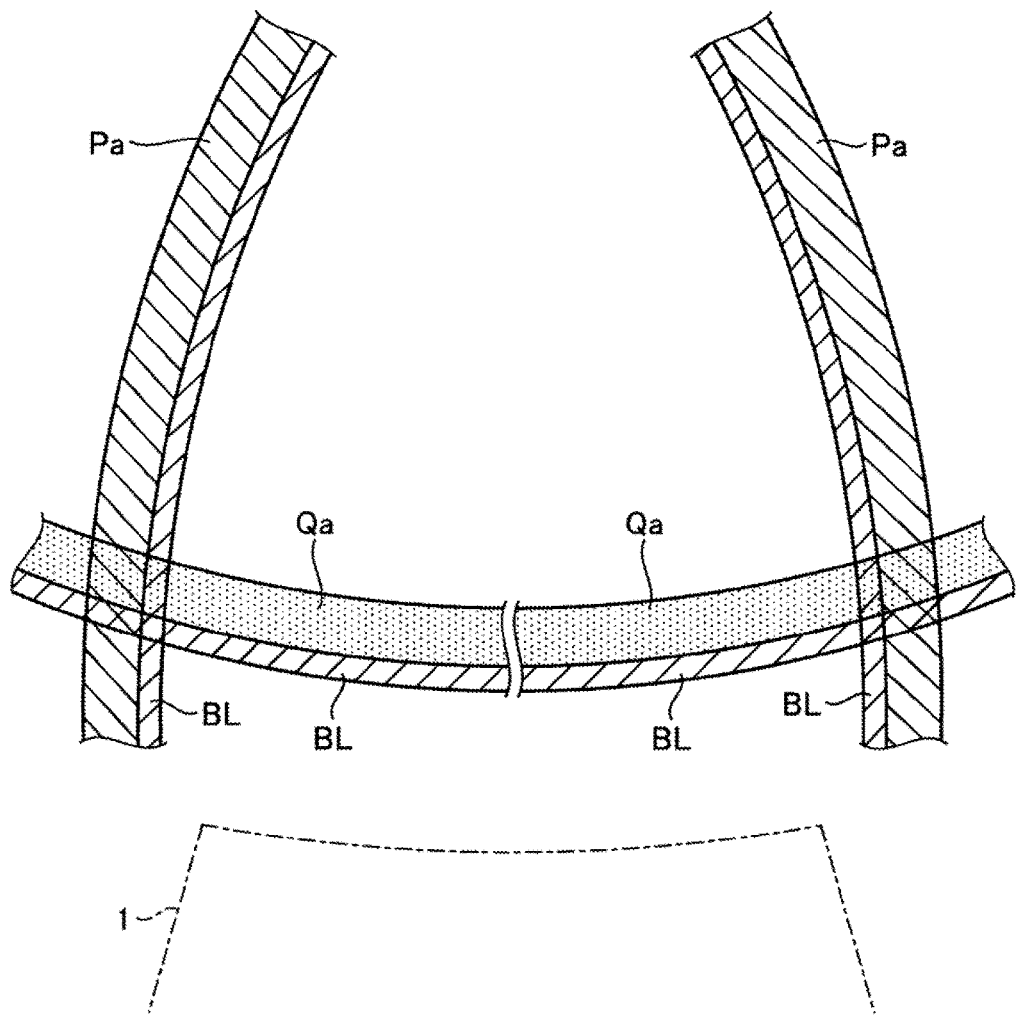

SURROUNDINGS MONITORING APPARATUS AND PROGRAM THEREOF

CROSS REFERENCE TO RELATED APPLICATIONS

This application is based on and claims priority under 35 U.S.C. § 119 to Japanese Patent Application 2014-003795, filed on Jan. 10, 2014, the entire content of which is incorporated herein by reference.

TECHNICAL FIELD

This disclosure generally relates to a surroundings monitoring apparatus and a program thereof.

BACKGROUND DISCUSSION

Conventionally, there is a technique for parking assist of a vehicle, where plural cameras which are mounted on the vehicle take or capture image data as environments surrounding the vehicle and the captured image data are provided to a driver of the vehicle. A known technique for assisting driving of the vehicle in a small area and/or for assisting driving of the vehicle during parking/stopping of the vehicle is suggested. According to the known technique for assisting driving of the vehicle, a front/rear direction mark and/or a right/left direction mark are displayed in a superimposed or overlapped manner over images which are displayed during the aforementioned parking assist. In the images, the above-described marks are displayed at positions that are away from the vehicle by respective predetermined distances so that the driver can refer to or see the marks. Accordingly, the driver's recognition of a positional relationship between an own vehicle and the environments surrounding the own vehicle is facilitated (JP2003-259356A, which will be referred to as Patent reference 1).

However, in a case where the images captured by the plural cameras are displayed and in a case where part of a captured area is included in the images in a duplicated manner between the images, the way the images look and/or impression conveyed by the images may differ from each other depending on positions of the plural cameras. Accordingly, even in a case where the same subject (for example, an object, the front/rear direction mark, the right/left direction mark) is displayed in the plural images, it may be difficult for the driver to understand a relationship between the plural images. In this case, even though a situation around the vehicle is displayed using the plural images, the images may not be fully utilized. In some cases, the plural images may bring confusion.

A need thus exists for a surroundings monitoring apparatus which is not susceptible to the drawback mentioned above.

SUMMARY

According to an aspect of this disclosure, a surroundings monitoring apparatus includes an obtaining portion obtaining a first captured image data outputted by a first image capturing portion and a second captured image data outputted by a second image capturing portion, the first image capturing portion being provided at a vehicle and capturing an image in a traveling direction of the vehicle and the second image capturing portion being provided at the vehicle and capturing an image in a width direction of the vehicle, the traveling direction of the vehicle corresponding to a first image capture region and the width direction of the vehicle corresponding to a second image capture region, and an output portion superimposingly displaying an indicator, which indicates a predetermined region relative to the vehicle, in at least one of a first display region displaying an image which is based on the first captured image data and a second display region displaying an image which is based on the second captured image data, a region in which the indicator is superimposedly displayed corresponding to a superimposed region of the indicator, in a case where the superimposed region of the indicator is included in the other of the first display region and the second display region, the output portion superimposingly displaying the indicator in the other of the first display region and the second display region in a display manner which corresponds to a display manner of the indicator displayed in the one of the first display region and the second display region.

According to another aspect of this disclosure, a program causes a computer to execute a step of obtaining a first captured image data outputted by a first image capturing portion and a second captured image data outputted by a second image capturing portion, the first image capturing portion being provided at a vehicle and capturing an image in a traveling direction of the vehicle and the second image capturing portion being provided at the vehicle and capturing an image in a width direction of the vehicle, the traveling direction of the vehicle corresponding to a first image capture region and the width direction of the vehicle corresponding to a second image capture region, and a step of outputting the image on which an indicator indicating a predetermined region relative to the vehicle is superimposedly displayed in a manner that the indicator is superimposedly displayed in at least one of a first display region displaying an image which is based on the first captured image data and a second display region displaying an image which is based on the second captured image data, a region in which the indicator is superimposedly displayed corresponding to a superimposed region of the indicator, and, in a case where the superimposed region of the indicator is included in the other of the first display region and the second display region, the indicator being outputted in a manner that the indicator is superimposedly displayed in the other of the first display region and the second display region in a display manner which corresponds to a display manner of the indicator displayed in the one of the first display region and the second display region.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a view illustrating an example of surrounding images which are displayed on a display device by the surroundings monitoring apparatus according to the embodiment;

FIG. 6 is a view illustrating an example of the reference line (an indicator) to which an emphasis processing is applied by the surroundings monitoring apparatus according to the embodiment;

DETAILED DESCRIPTION

An embodiment disclosed here will be described. A configuration of the embodiment described hereunder, and an operation and results (advantages and effects) brought by the configuration are adapted as an example. The present disclosure may be realized with other configuration than the configurations disclosed in the following embodiment. Further, various advantages and effects (which includes derivative advantages and effects) which are obtained in a basic configuration may be obtained in other configuration than the configurations disclosed in the following embodiment.

In the present embodiment, a vehicle 1 may correspond to, for example, an automobile (an internal combustion engine vehicle) whose drive source is an internal combustion engine (an engine). The vehicle 1 may correspond to, for example, an automobile (for example, an electric vehicle, a fuel cell powered vehicle) whose drive source is an electric motor (a motor). The vehicle 1 may correspond to an automobile (a hybrid vehicle) whose drive source is both the internal combustion engine and the electric motor. In addition, the vehicle 1 may be mounted with a speed change apparatus, that is, a transmission, of various kinds. The vehicle 1 may be mounted with various apparatuses (for example, systems, parts and components) that are needed to actuate the internal combustion engine and/or the electric motor. In addition, a type, the number, layout and the like of an apparatus which is related to driving of a wheel 3 of the vehicle 1 may be specified in various ways.

Figure 1:
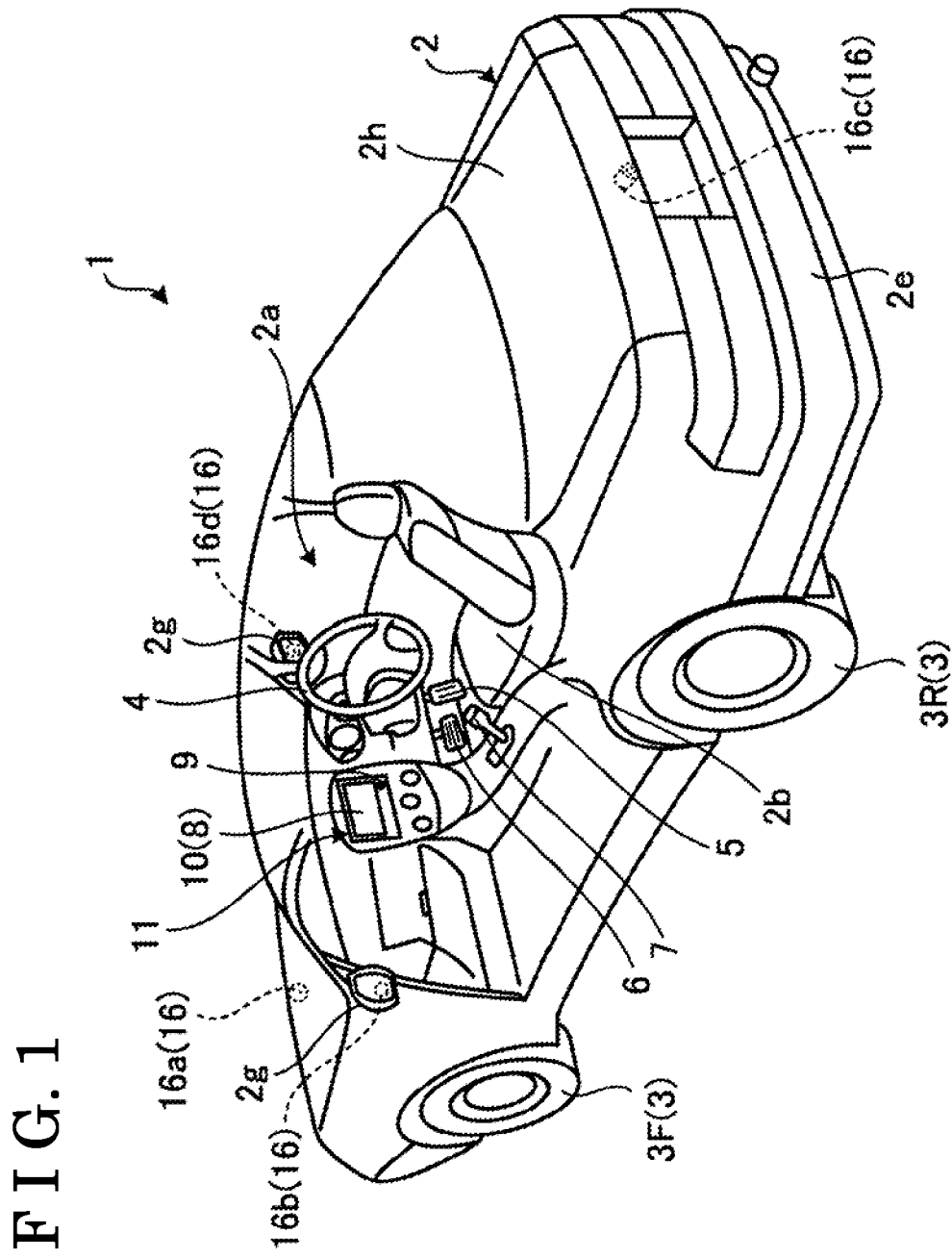
FIG. 1 is a perspective view which illustrates a vehicle mounted with a surroundings monitoring apparatus according to an embodiment disclosed here and in which a part of a vehicle cabin is seen through the vehicle.

As illustrated in FIG. 1, a vehicle body 2 includes a vehicle cabin 2a in which an occupant is onboard. For example, a steering portion 4, an acceleration operation portion 5, a brake operation portion 6, a shift operation portion 7 are provided inside the vehicle cabin 2a so as to face a seat 2b of a driver who corresponds to the occupant. In the present embodiment, as an example, the steering portion 4 corresponds to a steering wheel arranged to protrude from a dashboard (an instrument panel) of the vehicle 1, the acceleration operation portion 5 corresponds to an accelerator pedal positioned in a vicinity of a driver's foot, the brake operation portion 6 corresponds to a brake pedal positioned in a vicinity of the driver's foot, and the shift operation portion 7 corresponds to a shift lever arranged to protrude from a center console. However, the steering portion 4, the acceleration operation portion 5, the brake operation portion 6, the shift operation portion 7 are not limited thereto.

In addition, a display device 8 (a display output portion) and an audio output device 9 (an audio output portion) are provided in the vehicle cabin 2a. The display device 8 corresponds to, for example, a liquid crystal display (LCD) or an organic electroluminescent display (OELD). The audio output device 9 corresponds to, for example, a speaker. In addition, as an example in this embodiment, the display device 8 is covered with an operation input portion 10 (for example, a touch panel) which is transparent. The occupant and the like may visually recognize a projected image (an image) displayed on a display screen of the display device 8 via the operation input portion 10. In addition, the occupant and the like may perform operation input (instruction input) by operating, that is, for example, by touching, pressing and/or moving the operation input portion 10 with his/her finger or the like, at a position which corresponds to the projected image (the image) displayed on the display screen of the display device 8. In addition, as an example in this embodiment, the display device 8, the audio output device 9, the operation input portion 10 and the like are provided at a monitor device 11 which is positioned at a central portion of the dash board in a vehicle width direction (a right/left direction). The monitor device 11 may include an operation input portion corresponding to, for example, a switch, a dial, a joystick or a push button. In addition, an audio output device may be provided in the vehicle cabin 2a at a position that is other than the monitor device 11. In addition, audio such as sound or voice, may be outputted from the audio output device 9 of the monitor device 11 and from the other audio output device. In addition, in the present embodiment, the monitor device 11 also serves as a navigation system and/or an audio system as an example, however, a monitor device for the surroundings monitoring apparatus may be provided separately from the navigation system and/or the audio system. Further, the present embodiment may be configured in a manner that an audio output portion such as a buzzer outputs warning sound and the like, in addition to the audio output device 9.

Figure 2:
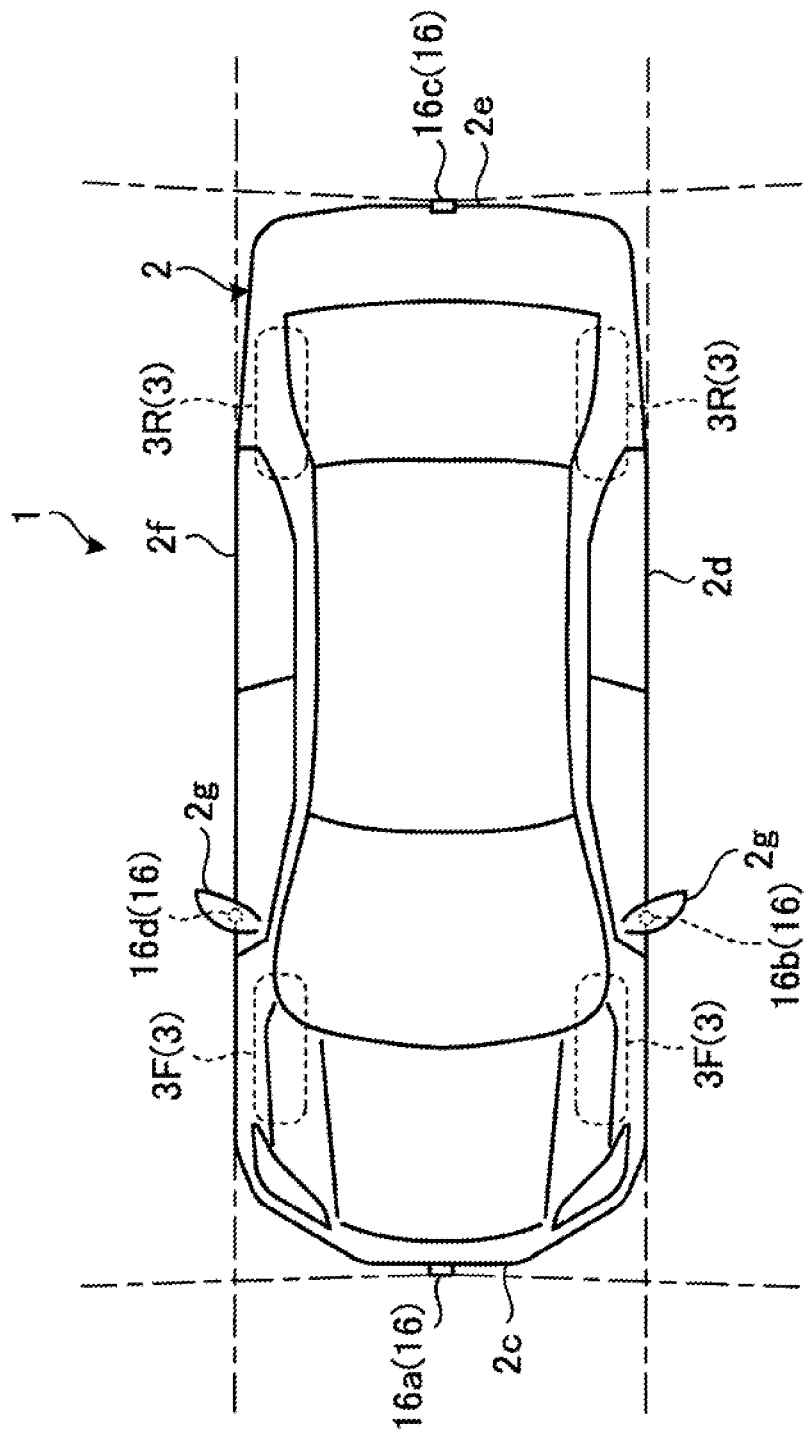
FIG. 2 is a plan view (a bird's-eye view) illustrating an example of the vehicle mounted with the surroundings monitoring apparatus according to the embodiment.

As illustrated in FIGS. 1 and 2, as an example in this embodiment, the vehicle 1 corresponds to a four-wheel vehicle (a four-wheel automobile), and includes two front wheels 3F provided at a left side and a right side, respectively, and two rear wheels 3R provided at the left side and the right side, respectively. For example, a tire angle of each of the front wheels 3F changes in response to an operation of the steering portion 4 (that is, turning operation). A steering system 12 corresponds to, for example, an electric power steering system or a steer by wire (SBW) system. The steering system 12 applies torque (assist torque) to the steering portion 4 by means of an actuator 12a to supplement a steering force, and steers the front wheel 3F. In another embodiment, the steering system 12 may be configured in a manner that the front wheels and the rear wheels are steered independently of each other or in a manner that the front wheels and the rear wheels are steered in an associated way with each other. In this case, the steering system is configured by the front wheel steering system 12 and a rear wheel steering system 13. The rear steering system 13 applies the torque (the assist torque) to the steering portion 4 by means of an actuator 13a. For example, the two front wheels 3F are steered to be substantially parallel to each other and to be in phase with each other (that is, the same phase, the same turning direction and the same rotational direction), and the two rear wheels 3R are steered to be substantially parallel to each other and to be in phase with each other. Driving wheels may be specified in various ways.

In addition, as an example in this embodiment, as illustrated in FIG. 2, the vehicle 1 (the vehicle body 2) includes plural image capturing portions 16 (for example, four image capturing portions 16a, 16b, 16c and 16d in this embodiment). Each of the image capturing portions 16 is a digital camera having therein an imaging element or an image pick-up device, including, for example, a charge coupled device (CCD) and/or CMOS image sensor (CIS). The image capturing portion 16 can output image data (moving image data, frame data) at a predetermined frame rate. Each of the image capturing portions 16 includes a wide-angle lens and can capture or take an image of an area (an angle of visibility) which ranges from, for example, 140 degrees to 220 degrees in a horizontal direction. In addition, an optical axis of each of the image capturing portions 16 is set in a downward direction (for example, a vertical direction or an obliquely downward direction). Accordingly, the image capturing portions 16 capture images of external environments around the vehicle body 2 which include a road surface on which the vehicle 1 may move.

As an example in this embodiment, the image obtaining portion 16a is arranged at an end portion 2c (the end portion when viewed in a plan view) at a front side (a forward side in a vehicle front/rear direction) of the vehicle body 2, and is provided at, for example, a front bumper. The image obtaining portion 16b is arranged at an end portion 2d at a left side (the left side in the vehicle width direction) of the vehicle body 2, and is provided at a door mirror 2g (a protruding portion) at the left side. The image obtaining portion 16c is arranged at an end portion 2e at a rear side (a rearward side in the vehicle front/rear direction) of the vehicle body 2, and is provided at a wall portion below a door 2h of a rear trunk. The image obtaining portion 16d is arranged at an end portion 2f at a right side (the right side in the vehicle width direction) of the vehicle body 2, and is provided at a door mirror 2g (a protruding portion) at the right side. Accordingly, for example, a front image captured at the image capturing portion 16a, a left-side image captured at the image capturing portion 16b and a right-side image captured at the image capturing portion 16d can be displayed at the display device 8 at the same time. Similarly, a rear image captured at the image capturing portion 16c, the left-side image captured at the image capturing portion 16b and the right-side image captured at the image capturing portion 16d can be displayed at the display device 8 at the same time. In a case where the rear image is displayed, the display of the left-side image and the right-side image may be omitted.

Figure 3:
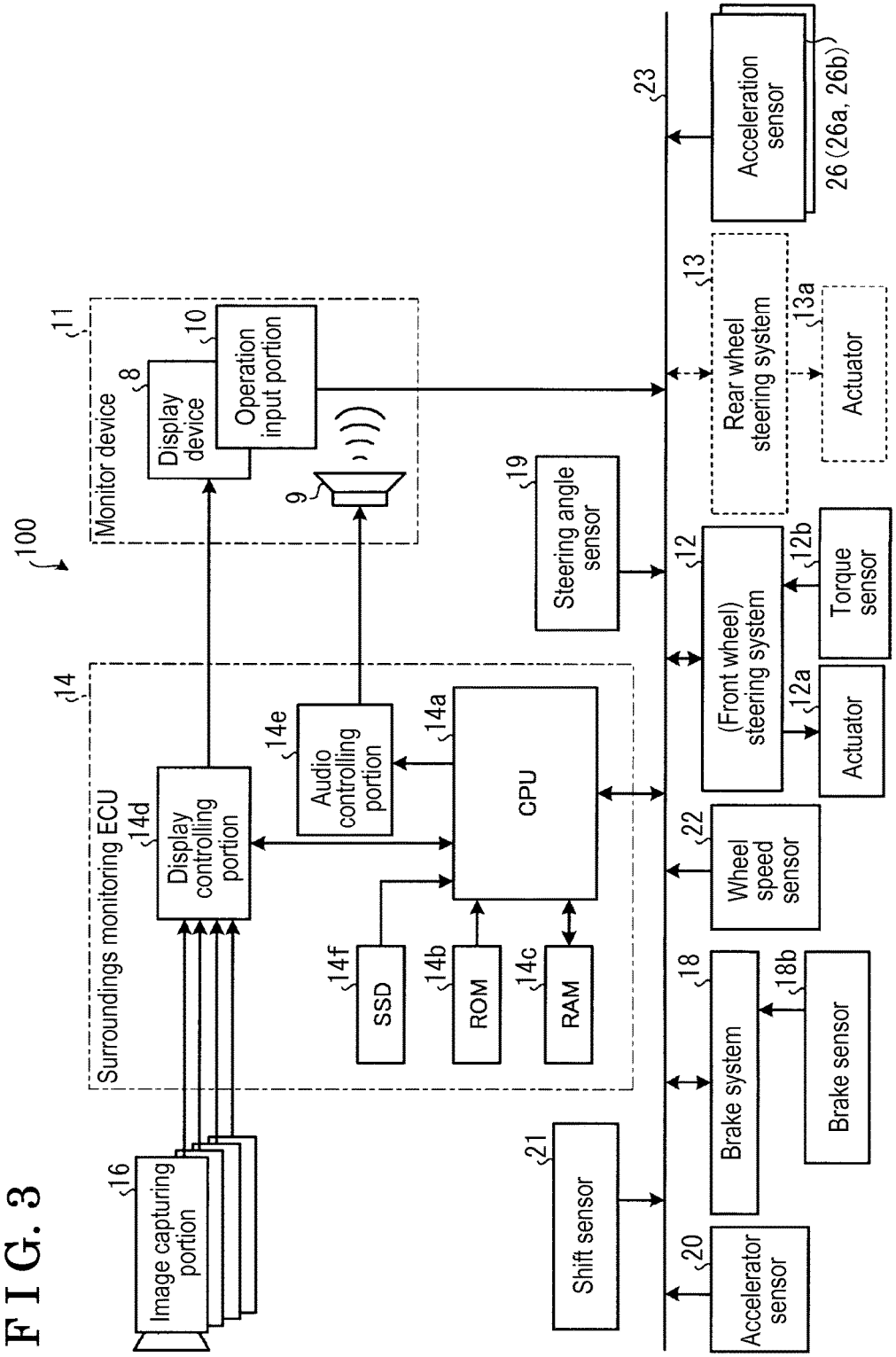
FIG. 3 is a block diagram illustrating an example of a system configuration of the surroundings monitoring apparatus according to the embodiment.

As illustrated in FIG. 3, as an example in this embodiment, in addition to a surroundings monitoring ECU 14 (electronic control unit) and the monitor device 11, for example, a brake system 18, a steering angle sensor 19 (an angle sensor), an accelerator sensor 20, a shift sensor 21, a wheel speed sensor 22, an acceleration sensor 26 and the like are electrically connected to one another via an in-vehicle network 23 (an electric communication line) at a surroundings monitoring system (surroundings monitoring apparatus) 100. The in-vehicle network 23 is configured, for example, as a controller area network (CAN). The surroundings monitoring ECU 14 may control the brake system 18 and the like by transmitting a control signal via the in-vehicle network 23. In addition, via the in-vehicle network 23, the surroundings monitoring ECU 14 may receive detection results of a torque sensor 12b, a brake sensor 18b, the steering angle sensor 19 (for the front wheels 3F), the accelerator sensor 20, the shift sensor 21, the wheel speed sensor 22, the acceleration sensor 26 and the like. In addition, via the in-vehicle network 23, the surroundings monitoring ECU 14 may receive an instruction signal (a control signal, an operation signal, an input signal, data) of, for example, the operation input portion 10.

In the present embodiment, the vehicle 1 includes two of the acceleration sensors 26 (the acceleration sensors 26a, 26b). In the present embodiment, the vehicle 1 is mounted with an electronic stability control (ESC). Thus, the acceleration sensors 26 (the acceleration sensors 26a, 26b), which are conventionally provided at the vehicle on which the ESC is mounted, are used. In the present embodiment, the acceleration sensor is not limited to a particular type, and any types of acceleration sensors are applicable as long as the acceleration sensor is configured to detect acceleration of the vehicle 1 in the right/left direction of the vehicle 1. In the present embodiment, acceleration of the vehicle 1 in the vehicle front/rear direction and the acceleration of the vehicle 1 in the right/left direction are obtained.

The surroundings monitoring ECU 14 includes, for example, CPU 14a (central processing unit), ROM 14b (read only memory), RAM 14c (random access memory), a display controlling portion 14d, an audio controlling portion 14e, and SSD 14f (solid state drive flash memory). For example, the CPU 14a may execute an image processing related to the image which is displayed at the display device 8, and various calculation processing including calculation of a moving path of the vehicle 1 and determination on presence or absence of interference between the vehicle 1 and an object. The CPU 14a reads out program stored (installed) in a nonvolatile memory device such as the ROM 14b, and executes the calculation processing in accordance with the program.

The RAM 14c temporarily stores the data which are used in the calculation executed at the CPU 14a. In addition, from among the calculation processings executed at the surroundings monitoring ECU 14, the display controlling portion 14d mainly executes, for example, an image processing which uses the image data obtained at the image obtaining portions 16 and an image processing (as an example, image synthesis or image compositing) of the image data that are to be displayed at the display device 8. In addition, from among the calculation processings executed at the surroundings monitoring ECU 14, the audio controlling portion 14e mainly executes processing of the audio data that are to be outputted at the audio output device 9. The SSD 14f is a rewritable nonvolatile storage portion, and thus stores the data even in a case where a power supply of the surroundings monitoring ECU 14 is switched off. The CPU 14a, the ROM 14b, the RAM 14c and the like may be integrated in a package. In addition, the surroundings monitoring ECU 14 may include a configuration where other logic operation processor, logic circuit and the like, including a digital signal processor (DSP), is used instead of the CPU 14a. In addition, the surroundings monitoring ECU 14 may be provided with a hard disk drive (HDD) instead of the SSD 14f. The SSD 14f and/or the HDD may be provided separately from the surroundings monitoring ECU 14.

Figure 4A:
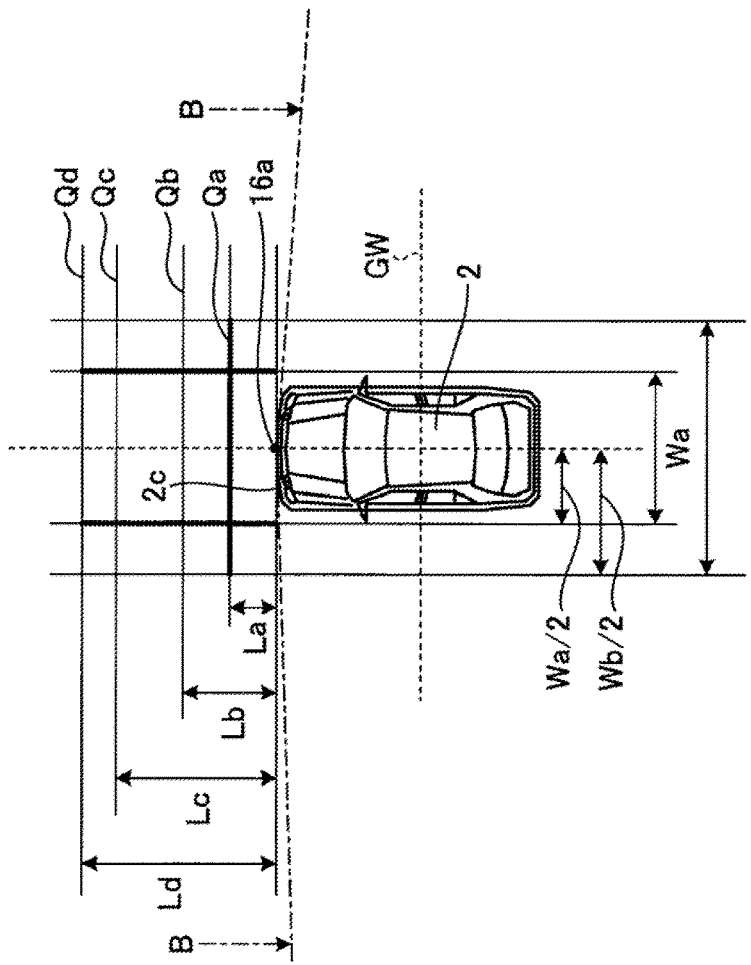
FIG. 4A is a view which explains a relationship among an image capture region captured by an image capturing portion of the surroundings monitoring apparatus according to the embodiment, a reference line which is superimposedly displayed in a display region, and the vehicle, and in which the image capture region corresponds to a vehicle lateral side.
Figure 4B:
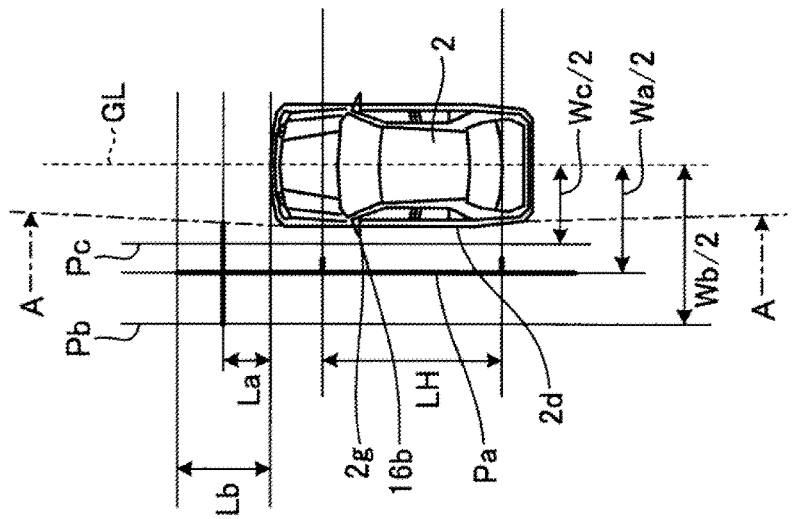
FIG. 4B is a view which explains a relationship among an image capture region captured by an image capturing portion of the surroundings monitoring apparatus according to the embodiment, a reference line which is superimposedly displayed in a display region, and the vehicle, and in which the image capture region corresponds to a vehicle front side.

Illustrated in FIGS. 4A and 4B are image capture regions A, B whose images are captured or taken by the image obtaining portions 16 of the surroundings monitoring system (surroundings monitoring apparatus) 100. In the present embodiment, the surroundings monitoring system 100 displays, at the display device 8, an image which is based on a second captured image data which is obtained by capturing an image of the image capture region A. When the surroundings monitoring system 100 displays the image which is based on the second captured image data, the surroundings monitoring system 100 superimposingly displays an indicator indicating a predetermined region relative to the vehicle 1 over the image. In a similar manner thereto, the surroundings monitoring system 100 displays, at the display device 8, an image which is based on a first captured image data which is obtained by capturing an image of the image capture region B. When the surroundings monitoring system 100 displays the image which is based on the first captured image data, the surroundings monitoring system 100 superimposingly displays an indicator indicating a predetermined region relative to the vehicle 1 over the image. Accordingly, each of FIGS. 4A and 4B indicates a relationship between the indicator superimposedly displayed at the display device 8 and the vehicle 1.

FIG. 4A illustrates the image capture region A (i.e., a second image capture region which is at the left side relative to the one-dot-chain line and is indicated with arrows A in FIG. 4A) of the image capturing portion 16b (i.e., a second image capturing portion) that is arranged at the door mirror 2g at the left side of the vehicle 1. The image capturing portion 16b obtains or captures a surrounding image, that is, an image of the surroundings of the vehicle 1, at the left side relative to the vehicle (the second captured image data) in a state where the optical axis thereof is set towards the road surface in the left direction of the vehicle width of the vehicle body 2. As described above, the image capturing portion 16b is provided with the wide-angle lens and thus includes the angle of visibility of, for example, 100 degrees at each of the right and left side relative to the optical axis therebetween (that is, the angle of visibility of 200 degrees in total). That is, the end portion 2d (for example, a door surface) at the left side of the vehicle body 2 is included in an image capturing range of the image capturing portion 16b. Then, as the indicator (i.e., a second indicator) superimposed over the surrounding image (the second captured image data) which is obtained by capturing the image of the image capture region A (the second image capture region), a reference line Pa is indicated at a position which is spaced away outwardly (in the vehicle width direction) relative to the vehicle 1 by a predetermined distance and is substantially parallel to an imaginary line GL passing through a center of the vehicle 1 in the vehicle front/rear direction. The reference line Pa indicates a distance reference from the end portion 2d of the vehicle body 2 to the reference line Pa. For example, the reference line Pa is displayed at a position which is away from the imaginary line GL by (Vehicle width+0.7=Wa)/2 m. The distance Wa serves as a predetermined distance. That is, the reference line Pa indicates the position that is away, by 0.35 m, from the end portion 2d at the left side of the vehicle body 2. Accordingly, in a case where an object, for example, another vehicle, a person or a wall surface, is shown in the surrounding image which shows the image capture region A, the driver (a user, an occupant) can easily estimate a distance from the object to the end portion 2d of the vehicle body 2 by reference to the reference line Pa. In addition, the driver can at least prevent the vehicle body 2 from being in contact with the object (an obstacle) by moving (operating) the vehicle 2 so that the object does not come close towards the vehicle body 2 beyond the reference line Pa.

As illustrated in FIG. 4A, in addition to the reference line Pa, an auxiliary line Pb and a vehicle width line Pc may be displayed in the surrounding image (the second captured image data) which is obtained by capturing the image of the image capture region A (the second image capture region) to serve as indicators that are parallel to the reference line Pa. The auxiliary line Pb may be indicated at a position which is away from the imaginary line GL by, for example, (Vehicle width+2.0=Wb)/2 m. The vehicle width line Pc may be displayed at a position which is away from the imaginary line GL by, for example, (Vehicle width+0.2=Wc)/2 m. With the indication of the plural indicators as described above, a sense of distance at the left side relative to the vehicle body 2 is further enhanced. In a case where the plural indicators are indicated, a main indicator (for example, the reference line Pa) may desirably be displayed clearly so that the main indicator is easily distinguished from the other auxiliary indicators (for example, the auxiliary line Pb and the vehicle width line Pc). For instance, the reference line Pa may desirably include a line type of a bold or thick line while each of the auxiliary line Pb and the vehicle width line Pc may include a line type of a fine or narrow line, or a dotted line.

In a similar manner to the above-described image capturing portion 16b, the image capturing portion 16d arranged at the door mirror 2g at the right side of the vehicle body 2 images or captures the surrounding image (the second captured image data) at the right side relative to the vehicle, which corresponds to the image capture region A (the second image capture region), in a state where the optical axis thereof is set towards the road surface in the right direction of the vehicle width direction of the vehicle body 2. The surroundings monitoring system 100 superimposingly displays the reference line Pa (and the auxiliary line Pb and/or the vehicle width line Pc as needed) over the surrounding image which is obtained by capturing the image of the image capture region A, and thus the effects and advantages are obtained which are similar to the effects and advantages obtained at the left side relative to the vehicle body 2. The number of indicators may be reduced at a driver-side (for example, the right side) because the driver can visually confirm the environments surrounding the vehicle 1 more easily at the driver-side. For example, only the reference line Pa may be superimposedly displayed. In addition, a mark (for example, a protruding or projecting mark on the reference line Pa) indicating a wheel base LH may be added to the reference line Pa. In this case, the driver can have a more accurate sense of length of his/her own car on the display screen.

FIG. 4B illustrates the image capture region B (i.e., a first image capture region which is at a vehicle front side relative to the one-dot-chain line and is indicated with arrows B in FIG. 4B) of the image capturing portion 16a (i.e., a first image capturing portion) that is arranged at a substantially center of the front bumper of the vehicle body 2. The image capturing portion 16a captures the surrounding image of the front side relative to the vehicle (the first captured image data) in a state where the optical axis thereof is set towards the front side relative to the vehicle body 2, in a slightly downward direction. As described above, the image capturing portion 16a is provided with the wide-angle lens and thus includes the angle of visibility of, for example, 100 degrees at each of the right and left side relative to the optical axis therebetween (that is, the angle of visibility of 200 degrees in total). That is, the end portion 2c (for example, the front bumper) at the front side of the vehicle body 2 is included in an image capturing range of the image capturing portion 16a. Then, as the indicator (i.e., a first indicator) superimposed over the surrounding image (the first captured image data) which is obtained by capturing the image of the image capture region B (the first image capture region), a reference line Qa is indicated at a position which is spaced away outwardly (in the vehicle front direction) relative to the vehicle 1 by a predetermined distance and is substantially parallel to an imaginary line GW passing through the center of the vehicle 1 in the vehicle width direction. The reference line Qa indicates a distance reference from the end portion 2c of the vehicle body 2 to the reference line Qa. For example, the reference line Qa is displayed at a position which is away from the most protruding portion (for example, the center) of the front bumper by La=0.5 m. The distance La serves as the predetermined distance. Accordingly, in a case where an object, for example, the wall surface, is shown in the surrounding image which shows the image capture region B, the driver (the user, the occupant) can easily estimate a distance from the object to the end portion 2c of the vehicle body 2 by referring to the reference line Qa. In addition, the driver can at least prevent the vehicle body 2 from being in contact with the object (the obstacle) by moving (operating) the vehicle 2 so that the object does not come close towards the vehicle body 2 beyond the reference line Qa.

As illustrated in FIG. 4B, in addition to the reference line Qa, an auxiliary lines Qb, Qc, Qd may be displayed in the surrounding image (the first captured image data) which is obtained by capturing the image of the image capture region B (the first image capture region) to serve as indicators that are parallel to the reference line Qa. The auxiliary line Qb may be indicated at a position that is away from the most protruding portion of the front bumper by, for example, Lb=1.0 m. The auxiliary line Qc may be indicated at a position that is away from the most protruding portion of the front bumper by, for example, Lc=2.0 m. The auxiliary line Qd may be indicated at a position that is away from the most protruding portion of the front bumper by, for example, Ld=2.7 m. With the indication of the plural indicators as described above, the sense of distance at the front side relative to the vehicle body 2 is further enhanced. In a case where the plural indicators are indicated, a main indicator (for example, the reference line Qa) may desirably be displayed clearly so that the main indicator is easily distinguished from the other auxiliary indicators (for example, the auxiliary lines Qb, Qc, Qd). For instance, the reference line Qa may include a line type of a bold or thick line while each of the auxiliary lines Qb, Qc, Qd may include a line type of a fine or narrow line, or a dotted line.

In a similar manner to the image capturing portion 16a, the image capturing portion 16c provided at the wall portion below the door 2h of the rear trunk (refer to FIGS. 1 and 2) captures or takes the surrounding image of a rear side relative to the vehicle, which corresponds to the image capture region B in a state where the optical axis thereof is set towards the rear side relative to the vehicle body 2, in a slightly downward direction. The surroundings monitoring system 100 superimposingly displays the reference line Qa (and the auxiliary lines Qb, Qc, Qd as needed) over the surrounding image which is obtained by capturing the image of the image capture region B, and thus the effects and advantages are obtained which are similar to the effects and advantages obtained at the front side relative to the vehicle body 2.

As illustrated in FIGS. 4A and 4B, a superimposed region of the indicator (for example, the reference line Pa) displayed in the surrounding image corresponding to one of the image capture regions (for example, the image capture region A) may be included in the surrounding image corresponding to the other of the image capture regions (for example, the image capture region B). The superimposed region of the indicator corresponds to the region in which the indicator is superimposedly displayed. That is, the reference line Pa included in the surrounding image of the lateral side relative to the vehicle may also appear in the surrounding image of the front side relative to the vehicle. Similarly, the reference line Qa included in the surrounding image of the front side relative to the vehicle may also appear in the surrounding image of the lateral side relative to the vehicle. In the meantime, when the surrounding image of the front side is displayed, it is considered that an entire situation around the vehicle can be more easily grasped if the surrounding images at the right and left sides are also displayed on the display screen in a manner that the surrounding image of the front side, and the surrounding images at the right and left sides are arranged side by side with one another. On the other hand, in a case where the above-described indicator (for example, the reference lines Pa, Qa and/or the auxiliary lines Pb, Qb) is displayed in each of the surrounding images mutually, the display may be complicated. As a result, it may be difficult for the driver (for example, the user, the occupant) to grasp the contents indicated by the indicators (the reference lines and the like). Therefore, a consideration is needed so that a correspondence relationship between the indicators which are displayed in the surrounding images mutually or interactively is grasped without difficulties.

In each of FIGS. 4A and 4B, for simplification and convenience of explanation, the image capture regions A, B, the reference line Pa, the reference line Qa and the like are illustrated in a view of the vehicle 1 which is seen from the top. In this case, each of the reference line Pa, the reference line Qa and the like is presented by a straight line that is parallel to the imaginary line (a straight line) passing through the center of the vehicle 1, and therefore the correspondence between the indicators that are displayed in the surrounding images mutually or interactively can be grasped relatively easily. However, as described above, the wide-angle lens including the wide angle of visibility is used for obtaining the surrounding image of the vehicle 1. In this case, the displayed surrounding image is a curved or distorted image, and thus the reference line Pa and the reference line Qa, each of which serves as the indicator, are also curved correspondingly. Consequently, it may be difficult for the driver (for example, the user, the occupant) to grasp the correspondence between the indicators that are displayed in the plural surrounding images in the mutual or interactive manner.

When displaying the surrounding images, the surroundings monitoring ECU 14 of the surroundings monitoring system 100 of the present embodiment superimposingly displays the indicator indicating the predetermined region relative to the vehicle 1 in at least one of the display regions, out of a second display region displaying the image corresponding to the image capture region A (the second image capture region) and a first display region displaying the image corresponding to the image capture region B (the first image capture region). In a case where the superimposed region of the indicator is included in the other display regions, in other words, in a case where the indicator is displayed also in the other display region, the surroundings monitoring ECU 14 superimposingly displays the indicator in the other display region in a display manner which corresponds to a display manner of the indicator in the one of the display region. For example, suppose the reference line Pa is displayed as the indicator in the display region of the surrounding image of the left side which corresponds to the image capture region A of the image obtaining portion 16b, and the reference line Pa is displayed as the indicator also in the display region of the surrounding image of the front side which corresponds to the image capture region B of the image obtaining portion 16a. In this case, if the display manner of the reference line Pa which is displayed in the surrounding image corresponding to the image capture region A is, for example, a blue-colored display manner, the display manner of the reference line Pa which is displayed in the surrounding image corresponding to the image capture region B is also the blue-colored display manner. Similarly, suppose the reference line Qa is displayed as the indicator in the display region of the surrounding image of the front side which corresponds to the image capture region B of the image obtaining portion 16a, and the reference line Qa is displayed as the indicator also in the display region of the surrounding image of the right and left sides which corresponds to the image capture region A. In this case, if the display manner of the reference line Qa which is displayed in the surrounding image corresponding to the image capture region B is, for example, a red-colored display manner, the display manner of the reference line Qa which is displayed in the surrounding image corresponding to the image capture region A is also the red-colored display manner.

Illustrated in FIG. 5 is an example of the surrounding image displayed at the display device 8. In the example illustrated in FIG. 5, at a central upper portion of FIG. 5, the surrounding image captured by the image capturing portion 16a in the image capture region B is displayed in a front display region FV. The front display region FV is formed in a trapezoidal shape and is arranged in a manner that a shorter side of the trapezoidal shape is positioned at a lower side. Because the front display region FV is arranged in the manner that the shorter side of the trapezoidal shape is positioned at the lower side, the front display region FV is displayed so as to look like a standing-type screen having a sense of depth. As a result, the surrounding image is displayed in a manner similar to an actual environmental circumstance that the user (for example, the driver and the occupant) visually recognizes. In addition, the surrounding image of the left side which is captured by the image capturing portion 16b in the image capture region A is displayed in a left-side display region SVL. The left-side display region SVL is formed in a substantially rectangular shape and is arranged to the left relative to the front display region FV. Similarly, the surrounding image of the right side which is captured by the image capturing portion 16d in the image capture region A is displayed in a right-side display region SVR. The right-side display region SVR is formed in a substantially rectangular shape and is arranged to the right relative to the front display region FV.

As illustrated in FIG. 5, the surrounding images of the respective lateral sides relative to the vehicle 1 are displayed in the left-side display region SVL and the right-side display region SVR. In addition thereto, in each of the left-side display region SVL and the right-side display region SVR, the reference line Pa indicating that the reference line Pa is apart from a corresponding side surface of the vehicle 1 by the predetermined distance is displayed in a manner that the reference line Pa is superimposed over the surrounding image. On the other hand, a part of the reference line Pa displayed in the left-side display region SVL is displayed at a left end portion of the front display region FV. Similarly, a part of the reference line Pa displayed in the right-side display region SVR is displayed at a right end portion of the front display region FV. That is, the superimposed region of the indicator in the left-side display region SVL and the superimposed region of the indicator in the right-side display region SVR are included in the front display region FV. In such a case, the surroundings monitoring ECU 14 displays the reference lines Pa which are displayed in the left-side display region SVL, the right-side display region SVR and the front display region FV, respectively, in the same display manner, that is, in the substantially same display color, for example. In this case, the reference lines Pa are displayed in a color which is not likely to assimilate into contents or elements in the display screen of the left-side display region SVL, the right-side display region SVR and the front display region FV, for example, a color which is not likely to assimilate into a color of the road surface. For example, the reference lines Pa may be displayed in "blue".

Similarly, as illustrated in FIG. 5, the surrounding image of the front side relative to the vehicle 1 is displayed in the front display region FV. In addition thereto, the reference line Qa indicating that the reference line Qa is apart from the front bumper of the vehicle 1 by the predetermined distance is displayed in the front display region FV in a manner that the reference line Qa is superimposed over the surrounding image. On the other hand, a part of the reference line Qa displayed in the front display region FV is displayed at a front end portion (at an upper side in FIG. 5) of each of the left-side display region SVL and the right-side display region SVR. That is, the superimposed region of the indicator in the front display region FV is included in each of the left-side display region SVL and the right-side display region SVR. In such a case, the surroundings monitoring ECU 14 displays the reference lines Qa which are displayed in the left-side display region SVL, the right-side display region SVR and the front display region FV, respectively, in the same display manner, that is, in the substantially same display color, for example. In this case, the reference lines Qa are displayed in a color which is not likely to assimilate into the contents or elements in the display screen of the left-side display region SVL, the right-side display region SVR and the front display region FV, for example, a color which is not likely to assimilate into the color of the road surface. Because also the reference lines Pa are superimposedly displayed in each of the front display region FV, the left-side display region SVL and the right-side display region SVR, it is desirable that the reference lines Qa are displayed in a display manner which is different from the display manner of the reference lines Pa so that the reference lines Pa and the reference lines Qa are not confused with each other. For example, the reference lines Qa may be displayed in "red".

As described above, each of the image capturing portions 16a, 16b, and 16d includes the wide-angle lens, and thus the captured images are likely to be distorted at end portions of the images. For example, in the left-side display region SVL and the right-side display region SVR, each of the reference lines Pa is substantially straight. However, each reference line Pa is presented by a curved line in the front display region FV. In the front display region FV, each reference line Qa is curved in a concave shape that is concaved towards the rear side. In each of the left-side display region SVL and the right-side display region SVR, however, the reference line Qa is curved in a convex shape towards the front side. Accordingly, even though the reference lines Pa (the reference lines Qa) which correspond to the same indicator are displayed in the front display region FV, the left-side display region SVL and the right-side display region SVR, the reference lines Pa (the reference lines Qa) appear to be indicators including the different shapes and different meanings from each other. As a result, the user (for example, the driver and the occupant) can be confused thereat.

The surroundings monitoring ECU 14 of the present embodiment displays the reference lines Pa (the reference lines Qa) displayed in the left-side display region SVL and the right-side display region SVR, and the reference line Pa (the reference line Qa) displayed in the front display region FV in the display manners that correspond to each other, for example, in the same color. Accordingly, the user (for example, the driver and the occupant) can recognize intuitively that the indicators which are displayed in the different display regions include the same meaning, that is, each of the reference lines Pa is at a position away from the vehicle side by 0.35 m, for example. In addition, according to the present embodiment, the reference line Pa and the reference line Qa are displayed in the different display manners from each other. Accordingly, the user (for example, the driver and the occupant) can recognize intuitively that the reference line Pa and the reference line Qa include the difference meanings from each other.

As described above, according to the present embodiment, even in a case where the indicators are displayed in the plural display regions and that the indicators are seemingly not related to each other, if the same indicators are displayed in the display manners that correspond to each other, the user (for example, the driver and the occupant) can easily recognize that the relevance exists between the indicators. As a result, a driving assist is provided for facilitating the quick recognition of the environmental circumstances around the vehicle 1 which are provided in a form of the plural displayed images, and thus a smooth driving of the vehicle is facilitated.

In the example illustrated in FIG. 5, the surroundings monitoring ECU 14 obtains an operation status of the steering portion 4 (the steering wheel) on the basis of output data of the steering angle sensor 19, estimates a direction or orientation of the front wheels 3F, and then superimposingly displays a course indicator R of the vehicle 1 in the front display region FV. The course indicator R indicates an estimated traveling direction of the vehicle 1. Because the course indicator R is displayed in the front display region FV, a relationship between the direction in which the vehicle 1 is about to move, and the reference line Pa and the reference line Qa is grasped easily. As a result, the reference line Pa and the reference line Qa are effectively utilized, and accordingly a driving assist can be provided which facilitates a driving for smoothly avoiding the obstacle, for example. A parsing processing (a drawing processing for making a far side narrower) may be applied to the course indicator R (a tire trajectory) that is superimposedly displayed in the front display region FV. In this case, the reference line Pa and the course indicator R are distinguished from each other easily, and thus it is easily emphasized that the reference line Pa is the line that is shown on the road surface. As a result, it is easily recognized that the reference line Pa superimposed in the front display region FV formed in the trapezoidal shape, and the reference line Pa superimposed in each of the left-side display region SVL and the right-side display region SVR are the same line (the reference line).

In addition, in FIG. 5, an angle meter (clinometer) indication region 30 is provided below the front display region FV and a symbol 32 representing a status of the vehicle 1 seen from the rear is indicated at the angle meter indication region 30. An attitude of the symbol 32 which is indicated at the angle meter indication region 30 corresponds to a roll angle and/or a pitch angle of the vehicle 1. Consequently, an objective grasp of a status of inclination of the vehicle 1 is facilitated.

The surrounding images displayed in, for example, the front display region FV, the left-side display region SVL and the right-side display region SVR include road surfaces in various conditions. Thus, in a case where the reference line Pa, the auxiliary line Pb, the reference line Qa, the auxiliary line Qb and the like are superimposedly displayed as the indicators, a sufficient identification may not be obtained even though a display color used for displaying the indicator offers a high ability to distinguish the indicator from the road surfaces, that is, even though the display color is highly distinguishable from the colors of the road surfaces. For example, the surroundings monitoring ECU 14 of the present embodiment may apply an emphasis processing along the reference line Pa (the reference line Qa) when indicating the reference line Pa (the reference line Qa). As an example of the emphasis processing, a shading BL may be applied to a side portion of the reference line Pa and/or the reference line Qa in a manner that the shading BL is provided at a vehicle-side of the reference line Pa and/or the reference line Qa as illustrated in FIG. 6. The shading BL applied to the indicator contributes to enhancing the identification of the indicator. Similarly, the shading BL may be added to the course indicator R illustrated in FIG. 5 for enhancing the identification of the course indicator R. The emphasis processing may be applied along the reference line, for example, in a manner that the emphasis is provided to a side portion, which is a far-side from the vehicle 1, of the reference line Pa (the reference line Qa) as long as the reference line Pa (the reference line Qa) is emphasized. Accordingly, the emphasis processing may be applied to either one of the vehicle-side of the line and the far-side of the line, or alternatively, the emphasis processing may be applied to both of the vehicle-side of the line and the far-side of the line.

The emphasis processing is not limited to the application of the shading BL. For example, the reference line Pa and/or the reference line Qa may be displayed in a blinking condition or a 3D processing may be applied to the reference line Pa and/or the reference line Qa. Further, these emphasis processings may be used with combination with the shading BL.

Figure 7:
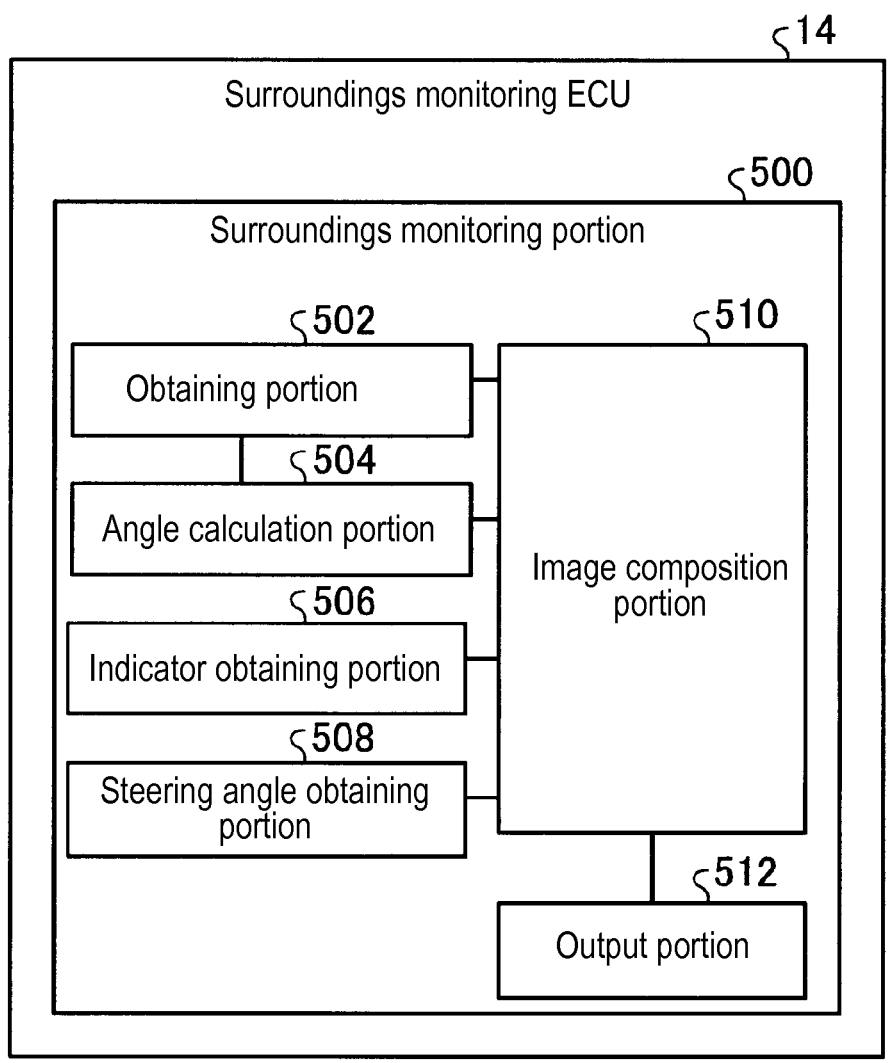
FIG. 7 is a block diagram illustrating a configuration of a surroundings monitoring portion which is implemented within a surroundings monitoring ECU of the surroundings monitoring apparatus according to the embodiment.

Illustrated in FIG. 7 is a block diagram of a configuration of a surroundings monitoring portion 500 which is implemented in the surroundings monitoring ECU 14 of the surroundings monitoring apparatus according to the present embodiment. The CPU 14a, which is configured as the surroundings monitoring ECU 14 illustrated in FIG. 3, executes software stored in the ROM 14b, and accordingly each of the configurations within the surroundings monitoring portion 500 illustrated in FIG. 7 is implemented.

In a case where the CPU 14a, which is configured as the surroundings monitoring ECU 14 illustrated in FIG. 3, executes software stored in the ROM 14b, each of the configurations within the surroundings monitoring portion 500 which are illustrated in FIG. 7 is implemented.

The surroundings monitoring portion 500 executes the software stored in the ROM 14b (computer-readable recording medium), and accordingly the surroundings monitoring portion 500 implements an obtaining portion 502, an angle calculation portion 504, an indicator obtaining portion 506, a steering angle obtaining portion 508, an image composition portion 510 and an output portion 512. The software (program) may be provided via computer-readable recording medium other than the ROM 14b.

In a case where an ignition switch, an electric power switch and/or a display start switch of the vehicle 1 is in an ON state, that is, the vehicle 1 is in a state where the vehicle 1 can be driven, or in a case where a display request is made by the user, the surroundings monitoring portion 500 of the present embodiment assists the driver to drive the vehicle 1. To assist the driver, the surroundings monitoring portion 500 displays the image data with which the environmental circumstances around the vehicle 1 are recognized and supplementary information related to the image data, on the basis of the captured image data inputted from the image capturing portions 16 and the data obtained from the acceleration sensor 26, the steering angle sensor 19 and the like.

The obtaining portion 502 obtains the captured image data outputted from the image capturing portions 16a, 16b, 16c, 16d which are provided at the vehicle 1 and capture or take the images of the surroundings of the vehicle 1. The obtaining portion 502 outputs the obtained captured image data to the image composition portion 510.

The angle calculation portion 504 calculates, at a predetermined cycle, an inclination angle (the pitch angle and the roll angle) of the vehicle 1 on the basis of acceleration data obtained by the acceleration sensors 26a, 26b. The pitch angle corresponds to an angle indicating an inclination or tilt of the vehicle 1 about a right and left axis, that is, a lateral axis, of the vehicle 1. The pitch angle is zero (0) degrees when the vehicle 1 is on a horizontal surface (the ground, a road surface). The roll angle corresponds to an angle indicating an inclination or tilt of the vehicle 1 about a front and rear axis of the vehicle 1. The roll angle is 0 degrees when the vehicle 1 is on the horizontal surface (the ground, the road surface). A known method for calculating the inclination angle may be used, and thus the explanation thereof is omitted. The inclination angle may be obtained in a method other than the above-described method where the inclination angle is calculated by using the acceleration sensor 26. For example, an inclination angle sensor may be used. The angle calculation portion 504 outputs the calculated inclination angle to the image composition portion 510.

The indicator obtaining portion 506 chooses and then obtains the indicator to be displayed out of plural indicator data (for example, data for the reference line Pa, data for the auxiliary line Pb, data for the reference line Qa, data for the auxiliary line Qb, data for the course indicator R) which are stored in the ROM 14b or the SSD 14f. Then, the indicator obtaining portion 506 outputs the obtained indicator data to the image composition portion 510.

The steering angle obtaining portion 508 obtains, in a predetermined cycle, steering angle data which is outputted from the steering angle sensor 19, and then the steering angle obtaining portion 508 outputs the obtained steering angle data to the image composition portion 510.

The image composition portion 510 executes an image composition process for superimposing the indicator data, which is supplied by the indicator obtaining portion 506, over the captured image data, which is supplied by the obtaining portion 502. At this time, in the front display region FV, the data for the reference line Qa, the data for the reference line Pa and the like which are for the front display are superimposed as illustrated in FIG. 5. Similarly, the data for the reference line Qa, the data for the reference line Pa and the like which are for the side display are superimposed in the left-side display region SVL and the right-side display region SVR as illustrated in FIG. 5. Further, the image composition portion 510 superimposes the data for the course indicator R, which is supplied by the indicator obtaining portion 506, in the front display region FV.

Because the traveling direction of the vehicle 1 changes depending on a steering angle direction of the front wheels 3F, the image composition portion 510 modifies the data for the course indicator R on the basis of the steering angle supplied by the steering angle obtaining portion 508, and then superimposes the modified data in the front display region FV. Further, the image composition portion 510 determines the attitude of the symbol 32 indicated at the angle meter indication region 30 on the basis of the inclination angle which is supplied by the indicator obtaining portion 506.

After completion of the data composition of the data which are to be displayed in the front display region FV, the left-side display region SVL, the right-side display region SVR and the angle meter indication region 30, the image composition portion 510 outputs the composed data to the output portion 512 in a predetermined cycle. The output portion 512 displays the received composite data, that is, the data after the image composition process, at the display device 8 as various driving assist information.

Figure 8:
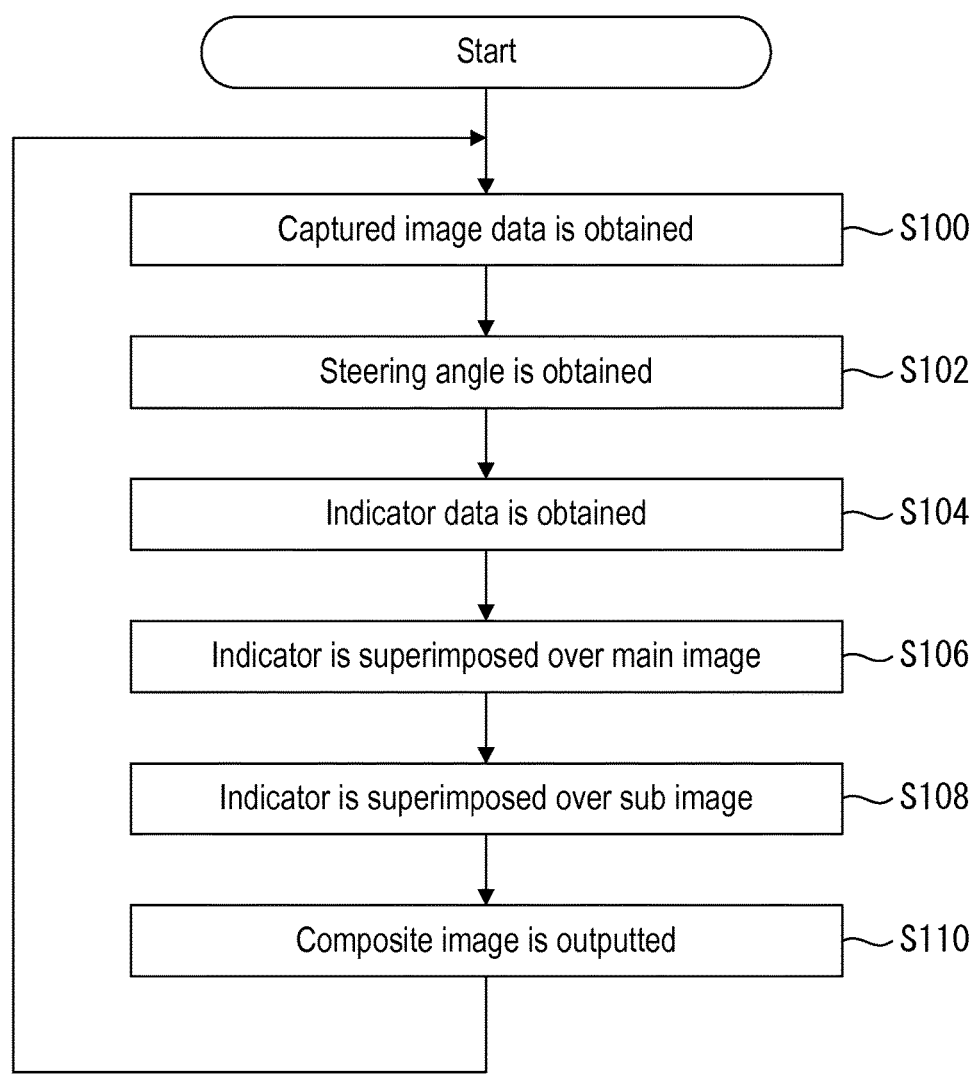
FIG. 8 is a flowchart showing a procedure of a display process at the surroundings monitoring apparatus according to the embodiment.

Illustrated in FIG. 8 is a flowchart showing a procedure of a display process at the image composition portion 510. The image composition portion 510 obtains the captured image data from the obtaining portion 502 in the predetermined cycle (Step S100). In addition, the image composition portion 510 obtains the steering angle from the steering angle obtaining portion 508 (Step S102), and calculates the current or present tire angle of each of the front wheels 3F on the basis of the obtained steering angle. Subsequently, the image composition portion 510 obtains, via the indicator obtaining portion 506, the indicator data which is to be superimposed over the obtained captured image data (Step S104).

The image composition portion 510 superimposes the data for the reference line Qa, the data for the reference line Pa and the data for the course indicator R over a main image, as the indicators (Step S106). The main image corresponds to the front image which is captured by the image capturing portion 16a and is to be displayed in the front display region FV. In addition, the image composition portion 510 superimposes the data for the reference line Pa and the data for the reference line Qa over a sub image, as the indicators (Step S108). The sub image corresponds to each of the left-side image and the right-side image which are captured by the image capturing portions 16b and 16d, and are to be displayed in the left-side display region SVL and the right-side display region SVR, respectively. Then, the image composition portion 510 supplies each of the superimposed images to the output portion 512, and the output portion 512 displays the surrounding images around the vehicle 1 on the display device 8 as illustrated in FIG. 5, that is, the output portion 512 outputs the composite image (Step S110).

As described above, the surroundings monitoring system 100 of the present embodiment displays the surrounding images of plural directions, which are captured by the image capturing portions 16, and the indicators related to the surrounding images. In addition thereto, the surroundings monitoring system 100 of the present embodiment displays the indicators, which are displayed in the images, in the display manner that facilitates the understanding of the relevance or relationship between the indicators. As a result, the relevance between the displayed images is visually recognized easily.

In the aforementioned embodiment, the explanation is made on a forward movement mode as an example. In the forward movement mode, the surroundings monitoring portion 500 displays the front display region FV, and the left-side display region SVL and the right-side display region SVR on the display device 8. As another embodiment, for example, in a case where it is confirmed that the vehicle 1 is about to move rearward on the basis of detected information from the shift sensor 21, the surroundings monitoring portion 500 may superimpose the indicators over the rear image captured by the image capturing portion 16*c* instead of by the image capturing portion 16*a*, and may display the rear image on the front display region FV. In addition, in a case where the vehicle 1 of the present embodiment moves rearward, the course indicator R of the rear wheels 3R during the rearward movement may be superimposed over the rear image on the basis of the steering angle sensor 19. In a case where the surrounding image and the indicators are displayed in a rearward movement mode described above, the indicators can be displayed in the display manner that facilitates the understanding of the relevance between the indicators. As a result, the relevance between the displayed images is visually recognized easily.

In addition, in the example of the present embodiment, the reference line Pa indicating the distance from the side surface of the vehicle and the reference line Qa indicating the distance from the front surface of the vehicle are used as indicators. However, for example, the indicator may be a symbol or a mark, or an indication of a region that shows the correspondence as long as the symbol, the mark or the indication facilitates the recognition of the position of the vehicle 1 in the surrounding images. Also in this case, when the same indicators are superimposedly displayed in the front display region FV, and in the left-side display region SVL and the right-side display region SVR, the indicators are displayed in the display manners that correspond to each other. As a result, the similar effects and advantages are obtained, that is, the relevance between the displayed images is visually recognized easily.

In addition, in the present embodiment, the auxiliary line Pb and/or the auxiliary line Qb may be displayed in addition to the reference line Pa and the reference line Qa as illustrated in FIG. 4. In this case, the reference line Pa and the reference line Qa are displayed in the colors that are easily distinguished or the emphasis processing is applied to the reference line Pa and the reference line Qa while the auxiliary line Pb and/or the auxiliary line Qb are displayed in a normal manner, that is, in an auxiliary or supportive manner. For example, the auxiliary line Pb and/or the auxiliary line Qb may be displayed by a white line. In another embodiment, the indicators may be switched as the user chooses so that the indicators are easily distinguished or identified. For example, in a case where more allowance is desired in the vehicle width direction relative to a particular indicator of interest, the auxiliary line Pb may be displayed in the colored manner or in the emphasized manner while the reference line Pa may be indicated by, for example, the white line. Similarly, the reference line Qa displayed in the front display region FV may be displayed in a manner that facilitates the identification or distinguishability of the auxiliary line Qb and the like. Accordingly, because the user can choose the indicator which is easy for the user to distinguish, the indicator can be displayed depending on the user's driving technique. As a result, the effects of the driving assist are enhanced.

This disclosure is not limited to the aforementioned embodiments. The embodiments are presented as examples and are not provided to intend to limit the scope of the disclosure. The embodiments may be implemented in various manners other than the presented examples, and various omissions, substitution and changes may be provided without departing from the scope of the disclosure. The embodiments and variations thereof are included in the scope and subject matter of the disclosure, and are included in the disclosure described in the scope of claims and a range of equivalents thereof.

According to the aforementioned embodiment, the surroundings monitoring apparatus 100 includes the obtaining portion 502 obtaining the first captured image data outputted by the image capturing portions 16*a*, 16*c* and the second captured image data outputted by the image capturing portions 16*b*, 16*d*, the image capturing portions 16*a*, 16*c* being provided at the vehicle 1 and capturing the image in the traveling direction of the vehicle 1 and the image capturing portions 16*b*, 16*d* being provided at the vehicle 1 and capturing the image in the width direction of the vehicle 1, the traveling direction of the vehicle 1 corresponding to the image capture region B and the width direction of the vehicle 1 corresponding to the image capture region A, and the output portion 512 superimposingly displaying the reference line Pa, Qa, which indicates the predetermined region relative to the vehicle 1, in at least one of the front display region FV (which serves as the first display region) displaying the image which is based on the first captured image data, and the left-side display region SVL and the right-side display region SVR (which serve as the second display region) each displaying the image which is based on the second captured image data, the region in which the reference line Pa, Qa is superimposedly displayed corresponding to the superimposed region of the reference line Pa, Qa, in a case where the superimposed region of the reference line Pa, Qa is included in the other of the front display region FV (which serves as the first display region), and the left-side and right-side display regions SVL, SVR (which serve as the second display region), the output portion 512 superimposingly displaying the reference line Pa, Qa in the other of the front display region FV, and the left-side and right-side display regions SVL, SVR in the display manner which corresponds to the display manner of the reference line Pa, Qa displayed in the one of the front display region FV, and the left-side display region SVL and the right-side display region SVR.

According to the above-described configuration, for example, in a case where the same reference line Pa, Qa is superimposedly displayed in the one of the display regions SVL, SVR and also in the other of the display regions SVL, SVR, the reference lines Pa, Qa (that is, the reference line Pa, Qa superimposedly displayed in the one of the display regions SVL, SVR and the reference line Pa, Qa superimposedly displayed in the other of the display regions SVL, SVR) are displayed in the display manners that correspond to each other. As a result, the relevance between the displayed images is visually recognized easily.

According to the aforementioned embodiment, in a case where the reference line Pa, Qa is indicated in the front display region FV, and the left-side and right-side display regions SVL, SVR in the display manners which correspond to each other, the output portion 512 displays the reference line Pa, Qa in the front display region FV, and the left-side and right-side display regions SVL, SVR in the display colors which are same as each other.

According to the above-described configuration, for example, it is visually recognized that the reference line Pa, Qa displayed in the one of the display regions SVL, SVR is the same as the reference line Pa, Qa displayed in the other of the display regions SVL, SVR easily.

According to the aforementioned embodiment, the reference line includes the reference line Qa and the reference line Pa, the output portion 512 displays the reference line Qa in the front display region FV and the reference line Pa in the left-side and right-side display regions SVL, SVR, the reference line Qa corresponds to the front display region FV and the reference line Pa corresponds to the left-side display region SVL and to the right-side display region SVR, the reference line Qa and the reference line Pa are displayed in the different display manners from each other.

According to the above-described configuration, even in a case where the reference line Qa and the reference line Pa are displayed in the same display region, the reference line Qa and the reference line Pa are visually distinguished from each other easily.

According to the aforementioned embodiment, the output portion 512 displays the reference line Pa, Qa as the indicator, the reference line Pa, Qa is parallel to the imaginary line GL, GW passing through the center of the vehicle 1 and indicates the position which is spaced away outwardly relative to the vehicle 1 by the predetermined distance Wa, La in the at least one of the front display region FV, and the left-side and right-side display regions SVL, SVR.

According to the above-described configuration, the sense of distance, when the vehicle 1 is being driven, between the vehicle 1 and the object around the vehicle 1 is visually recognized easily.

According to the aforementioned embodiment, the output portion 512 applies the emphasis processing to the reference line Pa, Qa along the reference line Pa, Qa to emphasize the reference line Pa, Qa.

According to the above-described configuration, the distinguishability between the object in the image capture region and the reference line Pa, Qa serving as the indicator is enhanced. As a result, the relevance between the images is visually recognized easily.

According to the aforementioned embodiment, the reference line Pa, Qa includes a vehicle-side and a far-side, the far-side is positioned farther from the vehicle 1 than the vehicle-side, and the output portion 512 applies the shading BL to at least one of the vehicle-side and the far-side of the reference line Pa, Qa as the emphasis processing.

According to the above-described configuration, the distinguishability between the object in the image capture region and the reference line Pa, Qa is enhanced by applying the simple image processing.

According to the aforementioned embodiment, the output portion 512 superimposingly displays the course indicator R in at least one of the front display region FV, and the left-side and right-side display regions SVL, SVR, the course indicator R indicates the estimated travel direction of the vehicle 1.

According to the above-described configuration, the course indicator R is displayed together with the reference line Qa or the reference line Pa, and thus the relationship between the traveling direction of the vehicle 1, and the reference line Qa or the reference line Pa is easily grasped.

According to the aforementioned embodiment, the program causes a computer to execute the step of obtaining the first captured image data outputted by the image capturing portions 16a, 16c and the second captured image data outputted by the image capturing portions 16b, 16d, the image capturing portions 16a, 16c being provided at the vehicle 1 and capturing the image in the traveling direction of the vehicle 1 and the image capturing portions 16b, 16d being provided at the vehicle 1 and capturing the image in the width direction of the vehicle 1, the traveling direction of the vehicle 1 corresponding to the image capture region B and the width direction of the vehicle 1 corresponding to the image capture region A. In addition, the program causes the computer to execute the step of outputting the image on which the reference line Pa, Qa indicating the predetermined region relative to the vehicle 1 is superimposedly displayed in a manner that the reference line Pa, Qa is superimposedly displayed in at least one of the front display region FV (which serves as the first display region) displaying the image which is based on the first captured image data, and the left-side display region SVL and the right-side display region SVR (which serve as the second display region) each displaying the image which is based on the second captured image data, the region in which the reference line Pa, Qa is superimposedly displayed corresponding to the superimposed region of the reference line Pa, Qa, and, in a case where the superimposed region of the reference line Pa, Qa is included in the other of the front display region FV (which serves as the first display region), and the left-side and right-side display regions SVL, SVR (which serve as the second display region), the reference line Pa, Qa is outputted in a manner that the reference line Pa, Qa is superimposedly displayed in the other of the front display region FV, and the left-side and right-side display regions SVL, SVR in the display manner which corresponds to the display manner of the reference line Pa, Qa displayed in the one of the front display region FV, and the left-side and right-side display regions SVL, SVR.

According to the above-described configuration, for example, in a case where the same reference line Pa, Qa is superimposedly displayed in the one of the display regions SVL, SVR and also in the other of the display regions SVL, SVR, the reference lines Pa, Qa (that is, the reference line Pa, Qa superimposedly displayed in the one of the display regions SVL, SVR and the reference line Pa, Qa superimposedly displayed in the other of the display regions SVL, SVR) are displayed in the display manners that correspond to each other. As a result, the relevance between the displayed images is visually recognized easily.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A surroundings monitoring apparatus comprising:
   an obtaining portion obtaining a first captured image data outputted by a first image capturing portion and a second captured image data outputted by a second image capturing portion, the first image capturing portion being provided at a vehicle and capturing an image in a traveling direction of the vehicle and the second image capturing portion being provided at the vehicle and capturing an image in a width direction of the vehicle, the traveling direction of the vehicle corresponding to a first image capture region and the width direction of the vehicle corresponding to a second image capture region; and
   an output portion superimposingly displaying an indicator, which indicates a predetermined region relative to the vehicle, in at least one of a first display region displaying an image which is based on the first captured image data and a second display region displaying an image which is based on the second captured image data, a region in which the indicator is superimposedly displayed corresponding to a superimposed region of the indicator, in a case where the superimposed region of the indicator is included in the other of the first display region and the second display region, the output portion superimposingly displaying the indicator in the other of the first display region and the second display region in a display manner which corresponds to a display manner of the indicator displayed in the one of the first display region and the second display region;

wherein the output portion displays reference lines, including a first reference line and a second reference line, as the indicator, wherein the first reference line, which is spaced away outwardly from a corresponding side surface of the vehicle by a first predetermined distance, is displayed in the second display region and a part of the first reference line displayed in the second display region is displayed in the first display region, wherein the second reference line, which is spaced away outwardly from a front or rear bumper of the vehicle by a second predetermined distance, is displayed in the first display region and a part of the second reference line displayed in the first display region is displayed in the second display region, wherein the first reference line extends, in both the first display region and the second display region, parallel to a line that extends in a linear traveling direction of the vehicle and extends along a single plane in both the first display region and the second display region, the single plane being parallel to a plane that extends along a ground surface, and wherein the second reference line extends, in both the first display region and the second display region, perpendicular to a line that extends in the linear traveling direction of the vehicle and extends along the single plane.

2. The surroundings monitoring apparatus according to claim 1, wherein in a case where the indicator is indicated in the first display region and in the second display region in the display manners which correspond to each other, the output portion displays the indicator in the first display region and in the second display region in display colors which are same as each other.

3. The surroundings monitoring apparatus according to claim 1, wherein the indicator includes a first indicator and a second indicator, the output portion displays the first indicator in the first display region and the second indicator in the second display region, the first indicator corresponds to the first display region and the second indicator corresponds to the second display region, the first indicator and the second indicator are displayed in different display manners from each other.

4. The surroundings monitoring apparatus according to claim 1, wherein the output portion applies an emphasis processing to at least one of the reference lines along the at least one of the reference lines to emphasize the at least one of the reference lines.

5. The surroundings monitoring apparatus according to claim 4, wherein the at least one of the reference lines include a vehicle-side and a far-side, the far-side is positioned farther from the vehicle than the vehicle-side, and the output portion applies a shading to at least one of the vehicle-side and the far-side of the at least one of the reference lines as the emphasis processing.

6. The surroundings monitoring apparatus according to claim 1, wherein the output portion superimposingly displays a course indicator in at least one of the first display region and the second display region, the course indicator indicates an estimated travel direction of the vehicle.

7. A non-transitory computer-readable medium, including a program for causing a computer to execute:

obtaining a first captured image data outputted by a first image capturing portion and a second captured image data outputted by a second image capturing portion, the first image capturing portion being provided at a vehicle and capturing an image in a traveling direction of the vehicle and the second image capturing portion being provided at the vehicle and capturing an image in a width direction of the vehicle, the traveling direction of the vehicle corresponding to a first image capture region and the width direction of the vehicle corresponding to a second image capture region; and outputting the image on which an indicator indicating a predetermined region relative to the vehicle is superimposedly displayed in a manner that the indicator is superimposedly displayed in at least one of a first display region displaying an image which is based on the first captured image data and a second display region displaying an image which is based on the second captured image data, a region in which the indicator is superimposedly displayed corresponding to a superimposed region of the indicator, and, in a case where the superimposed region of the indicator is included in the other of the first display region and the second display region, the indicator being outputted in a manner that the indicator is superimposedly displayed in the other of the first display region and the second display region in a display manner which corresponds to a display manner of the indicator displayed in the one of the first display region and the second display region;

wherein reference lines, including a first reference line and a second reference line, are displayed as the indicator, wherein the first reference line, which is spaced away outwardly from a corresponding side surface of the vehicle by a first predetermined distance, is displayed in the second display region and a part of the first reference line displayed in the second display region is displayed in the first display region, wherein the second reference line, which is spaced away outwardly from a front or rear bumper of the vehicle by a second predetermined distance, is displayed in the first display region and a part of the second reference line displayed in the first display region is displayed in the second display region, wherein the first reference line extends, in both the first display region and the second display region, parallel to a line that extends in a linear traveling direction of the vehicle and extends along a single plane in both the first display region and the second display region, the single plane being parallel to a plane that extends along a ground surface, and wherein the second reference line extends, in both the first display region and the second display region, perpendicular to a line that extends in the linear traveling direction of the vehicle and extends along the single plane.

* * * * *